United States Patent [19]
Holmquist

[11] Patent Number: 4,858,132
[45] Date of Patent: Aug. 15, 1989

[54] OPTICAL NAVIGATION SYSTEM FOR AN AUTOMATIC GUIDED VEHICLE, AND METHOD

[75] Inventor: Fredrik Holmquist, Charlotte, N.C.

[73] Assignee: NDC Technologies, Inc., Charlotte, N.C.

[21] Appl. No.: 95,608

[22] Filed: Sep. 11, 1987

[51] Int. Cl.$^4$ .............................................. G06F 15/50
[52] U.S. Cl. ............................... 364/424.02; 358/103; 180/169
[58] Field of Search ................... 364/424.02, 444, 449; 358/103; 180/168, 169

[56] References Cited

U.S. PATENT DOCUMENTS

| | | | |
|---|---|---|---|
| 4,482,960 | 11/1984 | Pryor | 364/444 |
| 4,626,995 | 12/1986 | Lofgren et al. | 364/449 |
| 4,679,152 | 7/1987 | Perdue | 364/424 |
| 4,700,301 | 10/1987 | Dyke | 364/424 |
| 4,703,820 | 11/1987 | Reinaud | 180/169 |
| 4,729,660 | 3/1988 | Tsumura et al. | 180/169 |
| 4,750,123 | 6/1988 | Christian | 358/103 |

*Primary Examiner*—Gary Chin
*Attorney, Agent, or Firm*—W. Thad Adams, III

[57] ABSTRACT

A navigation system for guiding an automatically guided vehicle along a variable, predetermined path defined by a plurality of fixed, spaced-apart points. A target is positioned at each spaced-apart point defining the target which includes first and light sources spaced horizontally apart. A light receiving camera and lens is mounted on the vehicle for receiving the first and second horizontally spaced-apart light beams and focusing the beams on a detector. The detector includes an access on which the light beams are focused. A difference in distance from the vertical axis of the detector of the two spaced-apart points represents a deviation from the proper path of the vehicle to the target and an equality of distance of the two spaced-apart points to the vertically extending axis represents the proper path to the target. A vehicle controller controls the vehicle position in relation to the target based on the information received by the camera and lens.

5 Claims, 6 Drawing Sheets

OPTICAL NAVIGATION SYSTEM FOR AN AUTOMATIC GUIDED VEHICLE, AND METHOD

TECHNICAL FIELD AND BACKGROUND OF THE INVENTION

This invention relates to a navigation system for an automatically guided vehicle, and a method of navigating an automatically guided vehicle. Characteristics of the system provide for both steering and distance measurement and control. The applicant is Assignee of U.S. Pat. No. 4,626,995 which discloses an apparatus and method for optical guidance of an automatic guided vehicle. In the '995 patent, a computer determines the cartesian coordinates of a single light source through a camera attached to the vehicle. Distance is determined by calculating the angle between the known height of the camera lens above the surface on which the vehicle travels and the known height of the light source above the surface on which the vehicle travels. The angle, or azimuth, is converted by the computer into a distance value.

The invention in the '995 patent performs well in many environments. However, in conditions where the surface on which the vehicle travels is irregular the computed angle is subject to error. In addition, many applications involve the placement and removal of heavy cargo onto and off of the vehicle. The changes in the weight on the vehicle cause the level of the camera to change due to, for example, tire and shock absorber compression, causing error in distance computation. In such instances, a wire guided system has been the usual alternative. The invention disclosed in this application avoids these problems and offers additional advantages such as the ability to guide over greater distances. The invention is particularly useful in environments such as hospitals, food and drug processing plants, offices, elevators, and areas with steel floors, ceramic tile floors or similar structures which cannot accept wire guidance-type systems. However, the system is so flexible that it can be used in combination with a wire-guided system, if desired.

SUMMARY OF THE INVENTION

Therefore, it is an object of the invention to provide a navigation system for an automatic guided vehicle which permits a vehicle to be steered and distance controlled by a light source.

It is another object of the invention to provide a navigation system for an automatic guided vehicle which permits steering and distance control over a significant distance.

It is another object of the invention to provide a navigation system for an automatic guided vehicle which permits accurate control of distance computation without regard to vehicle surface conditions or vehicle load variations.

These and other objects of the present invention are achieved in the preferred embodiments disclosed below by providing a navigation system for guiding an automatically guided vehicle having vehicle control means along a variable, pre-determined path defined by a plurality of fixed, spaced-apart points. According to one embodiment of the invention, the system comprises a target positioned at each spaced-apart point defining the vehicle path. The target includes a first light source for emitting a first light beam and a second light source horizontally spaced-apart from the first light source for emitting a second light beam. A light receiving camera and lens is mounted on the vehicle for receiving the first and second horizontally spaced-apart light beams and focusing the beams on a detector. The detector has a vertically extending axis representing the path of the vehicle to the target. The beams are focused on the detector at two spaced-apart points on opposite sides of the vertically extending axis wherein a difference in distance from the vertical axis of the detector of the two spaced-apart points represents a deviation from the proper path of the vehicle to the target and an equality of distance of two the spaced-apart points to the vertically extending axis represents the proper path to the target.

The detector includes means for converting the first and second light beams into a signal representing a bearing of the vehicle from the target and outputting the signal to the vehicle control means for controlling the vehicle position in relation to the target.

According to one preferred embodiment of the invention, the detector includes means for converting the distance between the two the spaced-apart points of the first and second light beams into a signal level proportionate to the distance of the vehicle from the target.

According to another preferred embodiment of the invention, the lens includes a filter for filtering out visible light to focus the first and second light beams at the detector.

According to one preferred embodiment of the invention, the detector includes means for sensing a predetermined voltage proportional to the distance of the vehicle from the target and directing vehicle control means to perform a vehicle function.

According to one preferred embodiment of the invention, the first and second light sources are adjustable to vary the distance therebetween for controlling the voltage level of the signal at which the detector directs the vehicle to perform a vehicle function.

According to yet another embodiment of the invention, a navigation system is provided for guiding an automatically guided vehicle having vehicle control means along a variable, pre-determined path defined by a plurality of fixed, spaced-apart points, and comprising a target positioned at each spaced-apart point defining the vehicle path, the target including a first vertical row of light sources for emitting a first series of converging light beam and a second vertical row of light sources horizontally spaced-apart from the first row of light sources for emitting a second series of light beams.

A light receiving camera and lens is mounted on the vehicle for receiving the first and second series of horizontally spaced-apart light beams and focusing the beams on a detector. The detector has a vertically extending axis representing the path of the vehicle to the target, the beams being focused on the detector at two spaced-apart points on opposite sides of the vertically extending axis wherein a difference in distance from the vertical axis of the detector of the two spaced-apart points represents a deviation from the proper path of the vehicle to the target and an equality of distance of two the spaced-apart points to the vertically extending axis represents the proper path to the target, and the position of the first and second series of light beams and the vertical field of view of the lens being configured for receiving all of the light beams at a predetermined distance from the target, light from a fewer number of light beams at a closer distance from the target and a light from a still fewer number of light beams at a still closer distance to the target whereby the rate of the change in intensity of the light beams as the vehicle approaches the target is reduced to within a range usable by the camera.

The detector including means for converting the first and second light beams into a signal representing a bearing of the vehicle from the target and outputting the signal to the vehicle control means for controlling the vehicle position in relation to the target.

According to one preferred embodiment of the invention, the system includes means for providing control information data between the vehicle and the target.

According to the method of the invention, the steps set forth in the description of the above system are carried out in the manner described.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
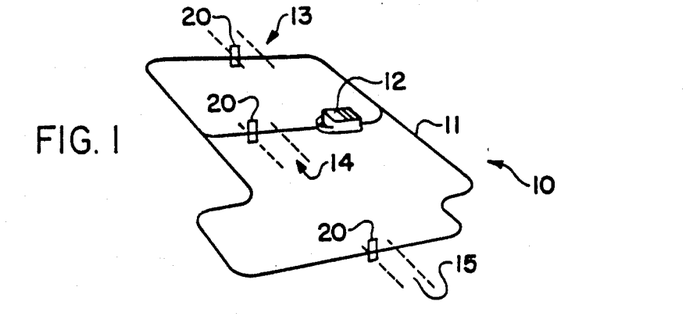
FIG. 1 is a perspective view of the floor plan of a hypothetical automatic guidance system which includes guidance according to the present invention and also by wire guidance.

Referring now specifically to the drawings, a navigation system for guiding an automatic guided vehicle according to the present invention is generally illustrated in FIG. 1 in a hypothetical environment at broad reference 10. While a number of different combinations of systems are possible, as noted above, in FIG. 1 a system according to the present invention is shown which combines with an inductive guidance wire 11 to offer a significant degree of flexibility. For example, the guidance wire 11 is a very cost effective alternative where the wire 11 can be laid into the floor and where the floor itself is very smooth and regular. The wire sensing apparatus is mounted on an automatic guided vehicle 12 but is not further described since it is not per se a part of this invention.

For purposes of illustration, it is presumed that there are areas in the operating environment which are not suitable for wire guidance for some reason. These areas are identified as areas 13, 14 and 15. These areas may range between approximately 0.3 meters to approximately 12–14 meters in length when using the particular system described in this application. Different systems operating according to the same principles but with different intensity lights and sensing apparatus can, of course, operate in a system having different distance ranges.

Still referring to FIG. 1, vehicle 12 moves along the wire 11 until it reaches one of the areas 13, 14 or 15. The arrival of the vehicle 12 at the correct location can be determined in a number of conventional ways.

In the discussion below, vehicle 12 may be in any one of the areas 13, 14, or 15.

Figure 2:
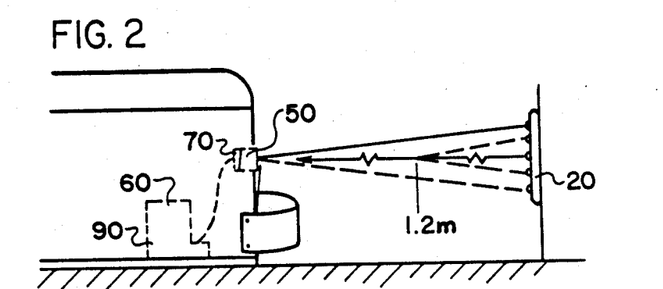
FIG. 2 is an elevational view of an automatic guided vehicle in relation to the guidance target.

Referring now to FIGS. 1 and 2, the navigation system 10 comprises three basic parts: a target 20, a camera 50 which includes a detector 70, and a signal processor. The signal processor 60 interfaces with a vehicle controller 90 which decodes signals transmitted by the camera 50 for guidance and distance detection.

Target 20 operates as a transmitter in the system and sends a modulated infrared light beam to the camera 50. While white light can be used, infrared has the advantage of being discrete from ambient environmental light which might interfere with the proper operation of the system. As is known, light intensity decreases by the square of the distance away from the target as that distance is increases and increases by the square of the distance away from the target as that distance decreases. From a distance of 0.3 meter from the target 20 to a distance of 14 meters from the target, the ratio of intensity is on the order of 2000 to 1. The camera 50 cannot properly detect this wide a variation, so a number of infrared light sources are used.

Figure 3:
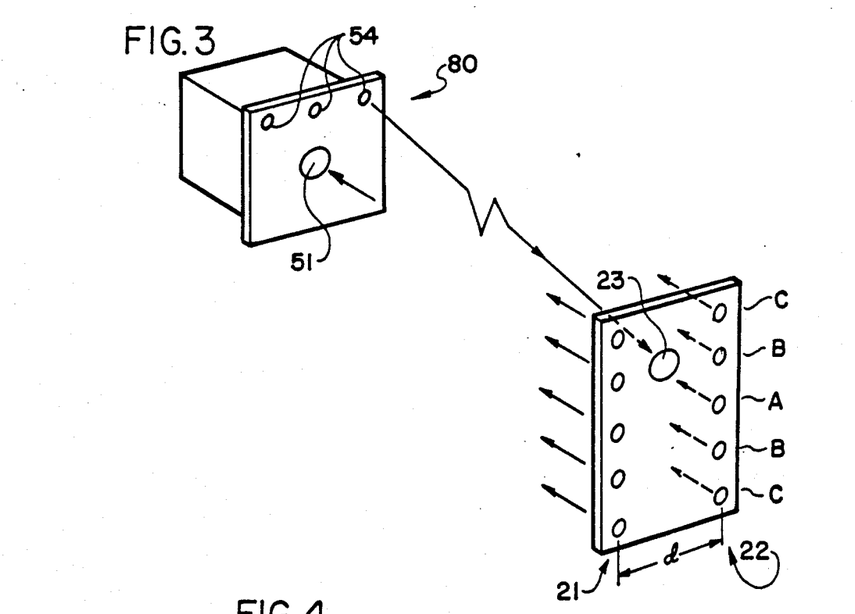
FIG. 3 is a perspective schematic view of one camera and target system according to the present invention.

As is shown in FIG. 3, the target 20 includes two parallel rows of lights 21 and 22, which are preferably infrared light emitting diodes. These rows are grouped around a center light 21a, 22a, respectively. A pair of intermediate lights 21b, 22b are positioned on either side of lights 21a, 22a, and a pair of outer lights 21c, 22c are positioned at the top and bottom of the target 20. The camera is provided with a limited vertical field of view. At a distances beyond 2.1 meters from the target 20, camera 50 receives light from all three groups of lights. At a distance of between 1.2 and 2.1 meters, camera 50 receives light only from the "a" and "b" groups of lights. At distances closer than 1.2 meters, camera 50 receives light only from the "a" group of lights. See FIG. 2.

In addition, the lights 21c, 22c emit 11 times as much light as do lights 21a, 22a. The lights 21b, 22b emit 2.5 times as much light as do lights 21a, 22a. Since there are twice as many "b" and "c" group lights as there are group "a" lights in the embodiment disclosed here, a variation in light intensity is created at the distance over which the system operates of an order of magnitude much less than if a single light was being sensed over a distance of 12 to 14 meters.

Figure 4:
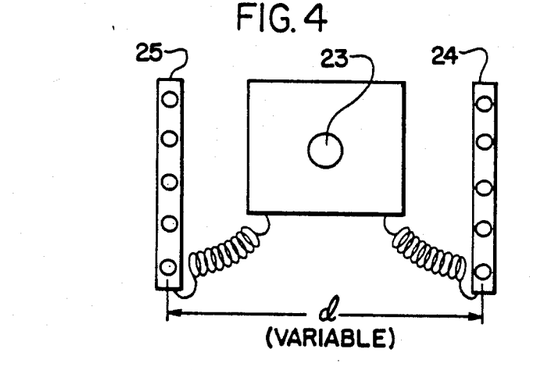
FIG. 4 is an elevational schematic view of a target having variable target light spacing and a communication receiver.

Target 20 can be constructed so as to be adjustable for operating at different positions and for different distances. This is accomplished by mounting lights 21, 22 on separate housings 24, 25 which are laterally movable relative to each other, as is shown in FIG. 4.

Figure 5:
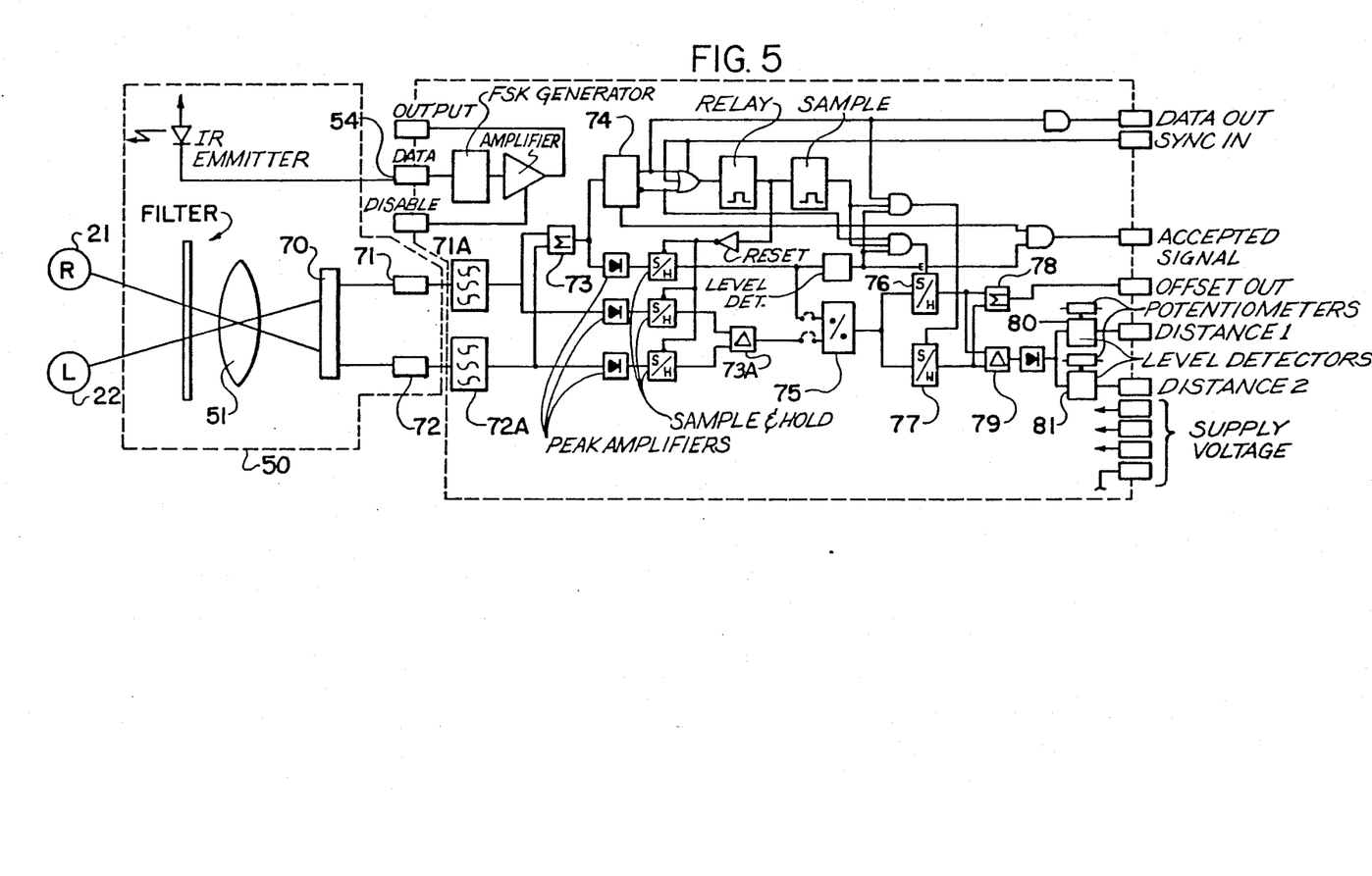
FIG. 5 is a schematic diagram of the signal processing circuitry.

Referring now to FIG. 5, camera 50 has a lens 51 over which is placed a infrared filter, if the camera is used in combination with a target 20 which is emitting infrared light. The photo detector 70 has a light sensitive grid which generates a signal to the signal processor 60. As described above, target 20 has two rows of lights 21, 22 which are a predetermined horizontal distance apart and collectively emit two pulse trains, each at a different frequency. These two pulse trains are focused at two different spots on the detector 70. The detector 70 creates a current which varies according to the place where the focused light strikes the detector 70 and the intensity of the light striking the detector 70.

Figure 6:
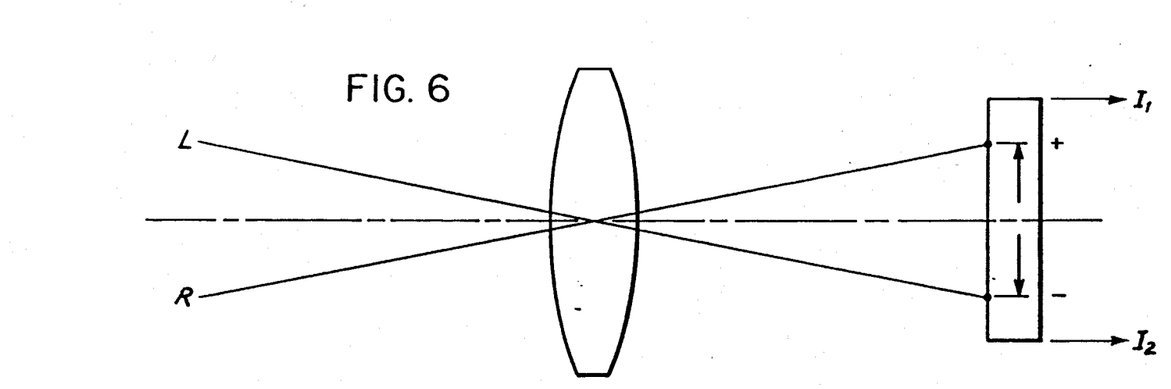
FIG. 6 is a schematic view illustrating the detection of the light from the target in order to process the light into signals representing distance and steering.

Detector 70 outputs a signal proportionate to the horizontal offset distance from the centerline of the detector 70, as is shown in FIG. 6. If the offset on one side is equal to the offset on the other side of detector 70, then the lights 21, 22 are straight ahead and the vehicle 12 is headed directly towards target 20. To cancel the light intensity variation for steering control, the two signals are directed through separate preamplifiers 71, 72 through filters 71A, 72A, respectively, to an integrator 73 where the signals are summed, giving the sum of the incoming current as a measurement of intensity. The difference in the horizontal offset of the preamp 71 signal from the preamp 72 signal is calculated in differentiator 73a. The difference from 73a is divided in a divider 75 by the sum of the two signals 73 to achieve a normalized value which is independent of intensity. The signal samples are synchronized in a phase-locked loop circuit 74. Sample and hold circuits 76, 77 are switched on to sample the values of the lights 21 and, while holding that value, to sample the lights 22 and holding that value. This sequence occurs over a time span of 10 milliseconds and then repeats, thereby sampling both rows of lights 100 times each second. This is an analog process.

Signal processing continues by summing values output from sample and hold circuits 76, 77 in a summing circuit 78 to give an offset signal. As is shown in FIG. 6, the row of lights 21 gives a negative value and the row of lights 22 a positive value. If they are summed and a zero value results, then they are equal in magnitude and the vehicle 12 is on the proper path. If anything other than a zero value is obtained the output from summing circuit comprises a signal proportional to the degree to which the vehicle 12 is deviated from the straight line path to target 20. The vehicle controller 90 receives this signal and corrects the path of the vehicle by steering the vehicle to the extent necessary to correct the deviation.

Figure 7:
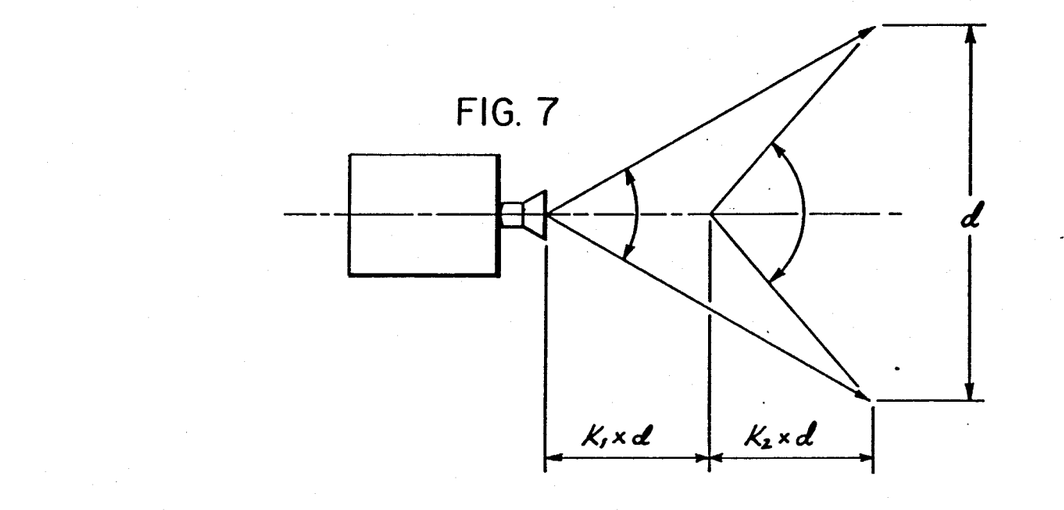
FIG. 7 is a top plan view showing the relationship between distance and the angle of view of the camera.

The distance detection function is achieved by finding the difference between the values of the sample/hold circuits 76 and 77 signals in a differentiating circuit 79. Since one of these signals is positive and one is negative, the difference obtained is positive and proportionate to the angle between the camera 50 and the two rows of lights 21, 22 created as the vehicle 12 approaches target 20. The value of a particular angle (angle 1 or angle 2 in FIG. 7) is inversely proportional to the distance $K1 \times d$ or $K2 \times 2$ to the target 20.

As the vehicle 50 approaches the target 20 the value of the sample and hold circuits 76 and 77 signals increases. The difference between these two values always gives a positive value at circuit 79. The positive signal proportional to the distance to the target 20 is output to two level detectors 80 and 81. These detect when a voltage is being achieved which corresponds to a desired vehicle function. When a preset voltage level is obtained, a signal is generated and sent to the vehicle controller 90. For example, an output signal from level detector 80 may indicate a reduction in speed or any other function. When vehicle 12 proceeds further and the voltage level required for level detector 81 is obtained, the vehicle controller 90 may stop the vehicle 12. As many level detectors as are needed can be added to output signals to a vehicle controller and thereby perform any necessary function at the exact location relative to a target where the function is required.

The appearance of the signals described above is summarized in FIG. 8. Row A represents the key frequency at the target 20. This can be 100 Hz. fixed frequency or, if the communication option is used, a bit pattern of the message.

Figure 8:
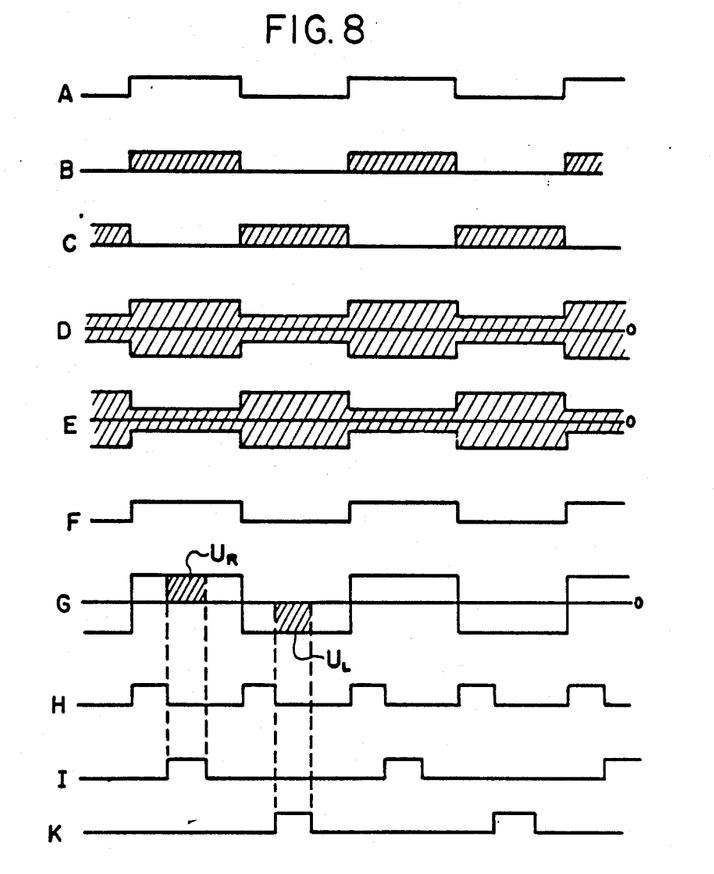
FIG. 8 is a schematic view illustrating frequency manipulation communication between the camera and the target according to one embodiment of the invention by which both distance computation and steering takes place.

In row B, a 13,330 Hz. modulated pulse train is transmitted by the right row of lights 22 of target 20. In row C, a 15,000 Hz. modulated pulse train is transmitted by the left row of lights 21 of target 20. Rows D and E illustrate the signals received through preamps 71, 72 and filters 71A, 72A. In row F, the key frequency of 100 Hz. is restored by phase lock loop circuit 74 for use in sampling synchronization. After processing through the divider circuit 75 the signal appears as is shown in row G. Row H illustrates the delay which occurs before each sample is taken. Rows I and K show the sampling periods of the right and left divider signals.

The camera 50 can be equipped with a transmitter 54 which operates in a loop with the target 20. The transmitter in camera 50 transmits a continuous modulated signal which is received by the receiving sensor 23 on target 20. See FIG. 4. The closer the camera 50 to the target 20, the higher the level of the signal amplitude received by sensor 23. This amplitude is used to transmit back to the camera 50 light having an intensity dependant on distance between the camera 50 and the target.

In accordance with another embodiment of the invention having, for example, two rows of lights with five vertically spaced-apart lights in each row, a range of from approximately 0.3 meters to 14 meters is practical. Referring to FIG. 2, up to 1.2 meters the transmitting effect is proportionate to a 3 milliamp current being transmitted by the center light in each row. At a distance of between 1.2 and 2.1 meters the current 19 milliamps, up to a point where at a distance greater than 2.1 meters the current is 90 milliamps.

Figure 9:
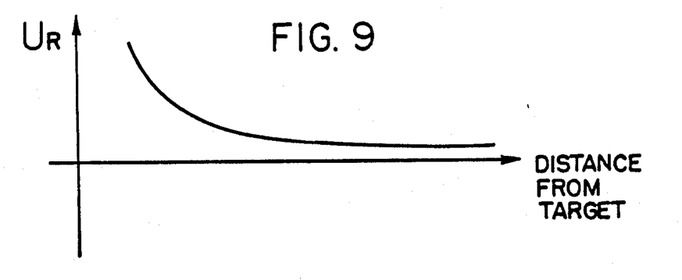
FIGS. 9-11 are graphs illustrating the relationship of the offset and distance signals.
Figure 10:
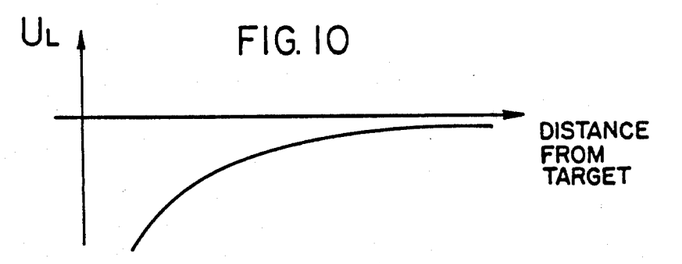
Figure 11:
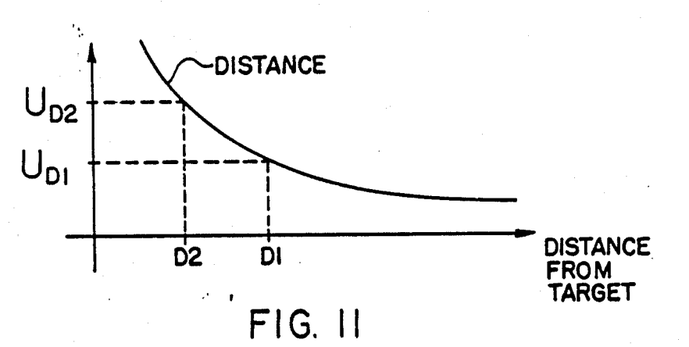

The relationship between the offset and distance signals are summarized in FIGS. 9, 10 and 11. As is shown in FIGS. 9 and 10, the offset signal used for guidance is the sum of the two values $U_r$ and $U_l$. As $U_r$ is normally positive and $U_l$ is normally negative, the offset value will be 0 when the amplitudes of the two signals are equal. This indicates that the vehicle is guiding directly towards a point in the middle between the left and right lights 21 and 22. As is shown in FIG. 11, the distance signal is the difference between the two values $U_r$ and $U_l$. As $U_r$ is normally positive and $U_l$ is normally negative, the distance value will be positive, increasing when the distance to the target 20 is decreasing.

An optical navigation system for an automatic guided vehicle and method is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A navigation system for guiding an automatically guided vehicle having vehicle control means along a variable, pre-determined path defined by a plurality of fixed, spaced-apart points, and comprising:
   (a) a target positioned at each spaced-apart point defining the vehicle path, said target including a first light source for emitting a first light beam and a second light source horizontally spaced-apart from said first light source for emitting a second light beam;
   (b) a light receiving camera and lens mounted on the vehicle for receiving said first and second horizontally spaced-apart light beams and focusing said beams on a detector, said detector having a vertically extending axis representing the path of the vehicle to the target, said beams being focused on said detector at two spaced-apart points on opposite sides of the vertically extending axis wherein a difference in distance from the vertical axis of the detector of said two spaced-apart points represents a deviation from the proper path of the vehicle to said target and an equality of distance of two said spaced-apart points to said vertically extending axis represents the proper path to the target; and
   (c) said detector including means for converting said first and second light beams into a signal representing a bearing of the vehicle from the target and outputting said signal to the vehicle control means for controlling the vehicle position in relation to the target.

2. A navigation system according to claim 1, wherein said detector includes means for converting the light intensity of the first and second light beams into a signal level proportionate to the distance of the vehicle from the target.

3. A navigation system according to claim 1, wherein said lens includes a filter for filtering out visible light to focus said first and second light beams at said detector.

4. A navigation system according to claim 1, wherein said first and second light sources are adjustable to vary the distance therebetween for controlling the voltage level of the signal at which the detector directs the vehicle to perform a vehicle function.

5. A navigation system for guiding an automatically guided vehicle having vehicle control means along a variable, pre-determined path defined by a plurality of fixed, spaced-apart points, and comprising:
   (a) a target positioned at each spaced-apart point defining the vehicle path, said target including a first vertical row of light sources for emitting a first series of converging light beams and a second vertical row of light sources horizontally spaced-apart from said first row of light sources for emitting a second series of light beams;
   (b) a light receiving camera and lens mounted on the vehicle for receiving said first and second series of horizontally spaced-apart light beams and focusing said first and second series of light beams on a detector, said detector having a vertically extending axis representing the path of the vehicle to the target, said first and second series of light beams being focused on said detector at two spaced-apart points on opposite sides of the vertically extending axis wherein a difference in distance from the vertical axis of the detector of said two spaced-apart points represents a deviation from the proper path of the vehicle to said target and an equality of distance of two said spaced-apart points to said vertically extending axis represents the proper path to the target, and the position of said first and second series of light beams and the vertical field of view of said lens being configured for receiving:
      (1) all of the light beams at a predetermined distance from the target;
      (2) light from a fewer number of light beams at a closer distance from the target; and
      (3) a light from a still fewer number of light beams at a still closer distance to the target, whereby the rate of the change in intensity of the light beams as the vehicle approaches the target is reduced to within a range usable by the camera; and
   (c) said detector including means for converting said first and second light beams into a signal representing a bearing of the vehicle from the target and outputting said signal to the vehicle control means for controlling the vehicle position in relation to the target.

* * * * *